Figure 1:
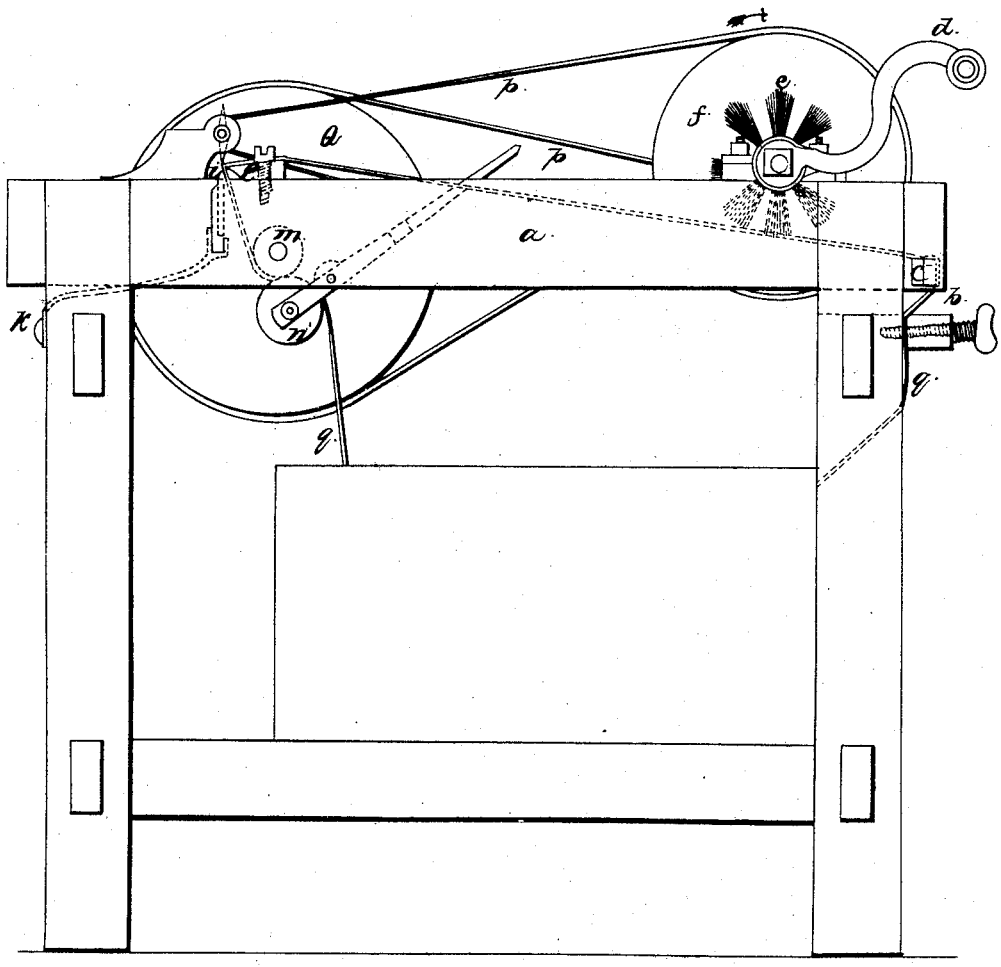
Figure 2:
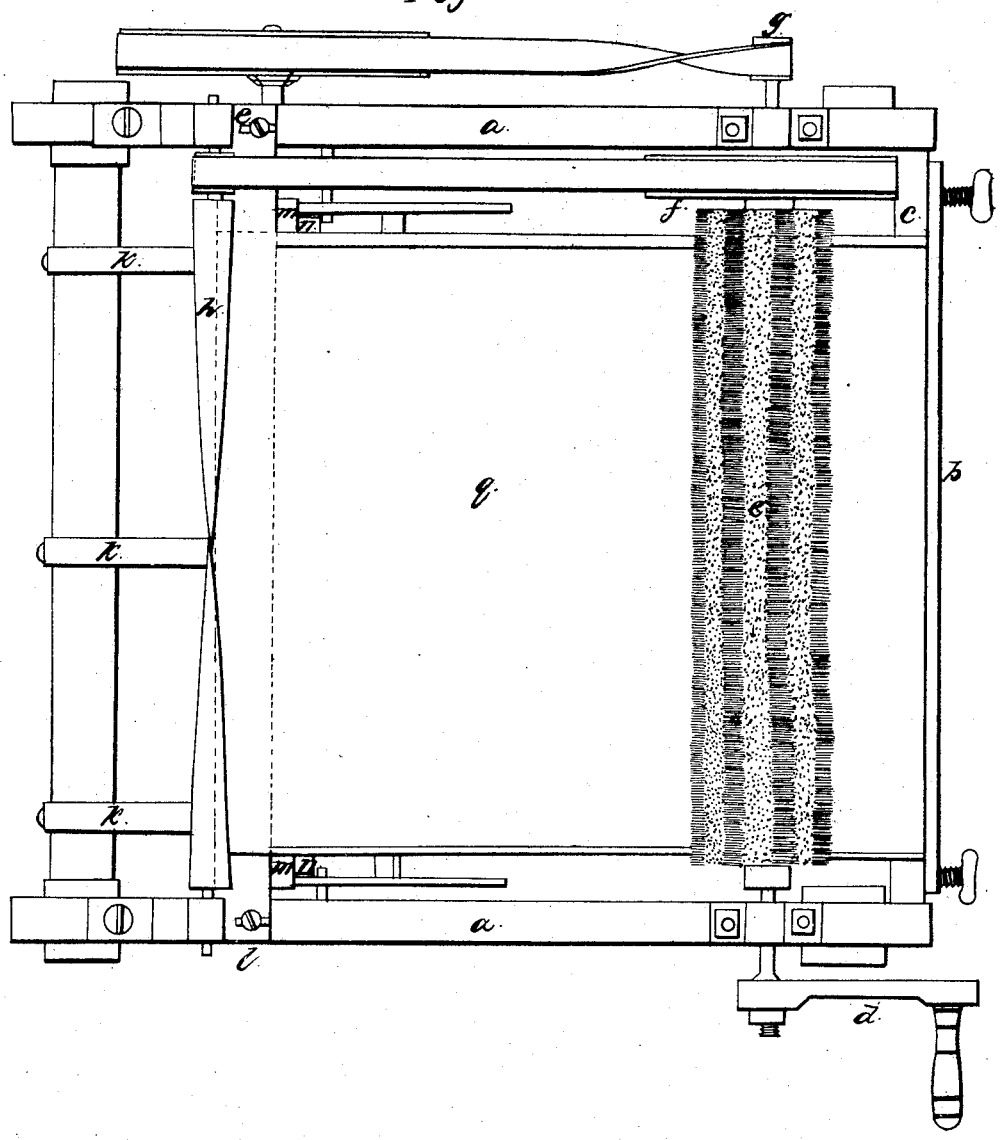
Figure 3:
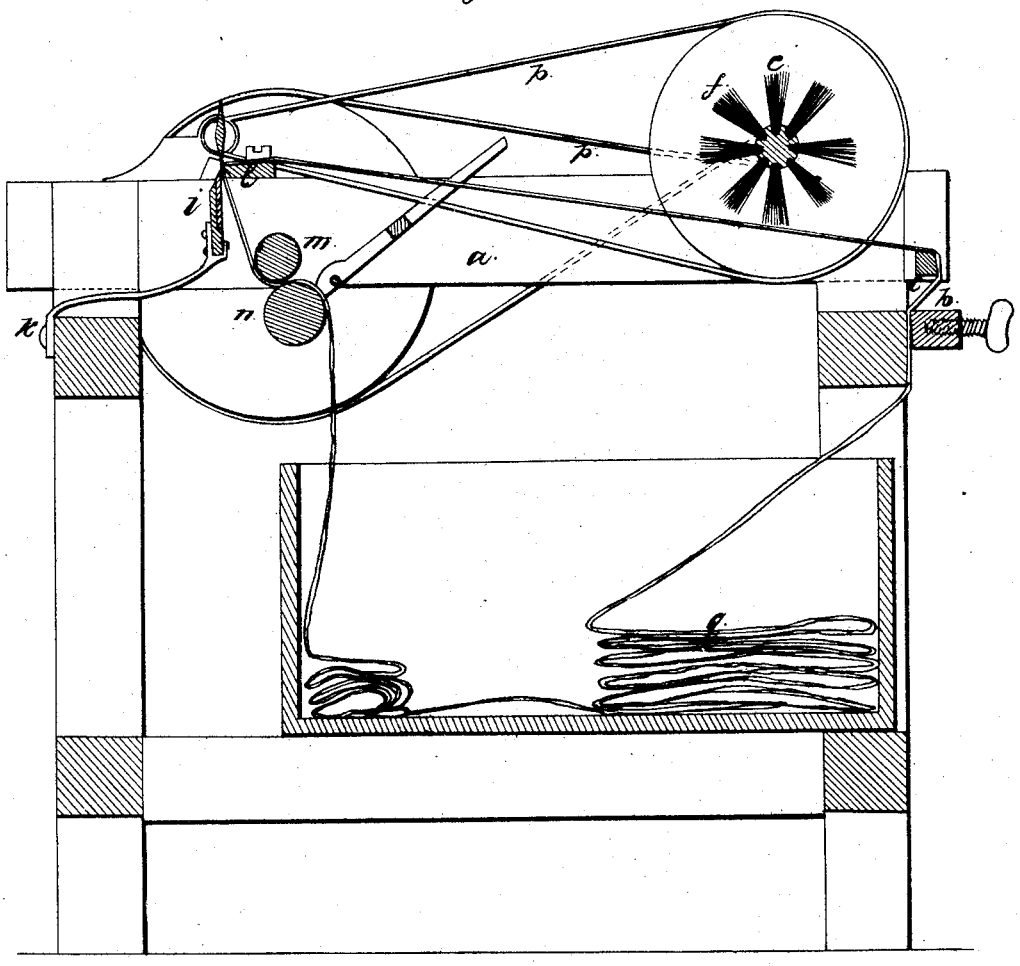
Figure 4:
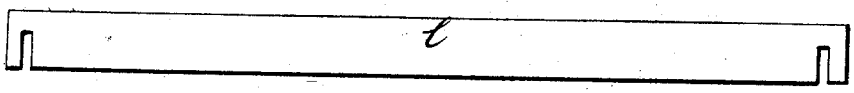
Figure 5:
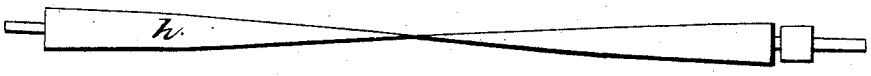
Figure 6:
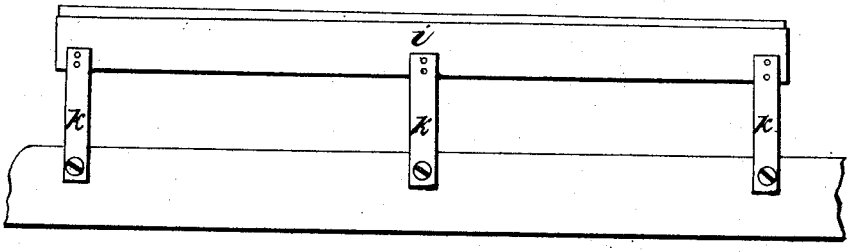
Figure 7:
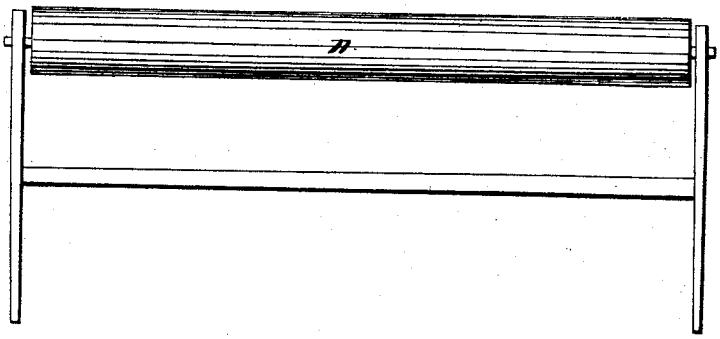

2925X

4 Sheet—Sheet 1.

D. DEWEY.

Cloth Shearing.

Patented March 16, 1818.

THE NORRIS PETERS CO., PHOTO-LITHO., WASHINGTON, D. C.

2925X

4 Sheet—Sheet 2.

D. DEWEY.

Cloth Shearing.

Patented March 16, 1818.

THE NORRIS PETERS CO., PHOTO-LITHO., WASHINGTON, D. C.

2925X

4 Sheet—Sheet 3.

D. DEWEY.

Cloth Shearing.

Patented March 16, 1818.

THE NORRIS PETERS CO., PHOTO-LITHO., WASHINGTON, D. C.

2925X

4 Sheet—Sheet 4.

D. DEWEY.

Cloth Shearing.

Patented March 16, 1818.

THE NORRIS PETERS CO., PHOTO-LITHO., WASHINGTON, D. C.

United States Patent Office

PTO - BOYERS, PA Duty Station

MISSING PAGE TEMPORARY NOTICE

PATENT # 2925X FOR ISSUE DATE 3-16-1818

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # All text

Data Conversion Operation

Boyers, Pa